US007618001B2

(12) United States Patent
Aries et al.

(10) Patent No.: US 7,618,001 B2

(45) Date of Patent: Nov. 17, 2009

(54) SHREDDER ARRANGEMENT

(75) Inventors: Paul Arthur Aries, Bierley Hills (GB); Michael Sawford, Aylesbury (GB); Ian Stuart Smith, Northants (GB)

(73) Assignee: ACCO UK Limited, Aylesbury (GB)

( * ) Notice: Subject to any disclaimer, the term of this patent is extended or adjusted under 35 U.S.C. 154(b) by 33 days.

(21) Appl. No.: 11/943,234

(22) Filed: Nov. 20, 2007

(65) Prior Publication Data

US 2008/0169370 A1 Jul. 17, 2008

(30) Foreign Application Priority Data

Jan. 15, 2007 (GB) ................................ 0700758.6

(51) Int. Cl.
*B23Q 11/00* (2006.01)

(52) U.S. Cl. ...................................... 241/37.5; 241/100

(58) Field of Classification Search ................. 241/100, 241/37.5, 236
See application file for complete search history.

(56) References Cited

U.S. PATENT DOCUMENTS

| | | | | |
|---|---|---|---|---|
| 4,821,967 | A * | 4/1989 | Moriyama | 241/37.5 |
| 7,213,780 | B2 * | 5/2007 | Chen | 241/100 |
| 7,398,936 | B1 * | 7/2008 | Wang | 241/100 |
| 2006/0175444 | A1 | 8/2006 | Chen | |

* cited by examiner

*Primary Examiner*—Faye Francis
(74) *Attorney, Agent, or Firm*—Michael Best & Friedrich LLP

(57) ABSTRACT

A shredder arrangement comprising a housing defining a feed slot for receiving sheet material inserted by a user; a cutting mechanism for shredding the sheet material inserted through the feed slot, and a protective guard for positioning across the feed slot to prevent relatively rigid sheet material from striking the user during shredding of such sheet material, the guard defining an aperture allowing said sheet material to be inserted through the guard and into the feed slot; wherein the protective guard is moveable between a first configuration and a second configuration to symmetrically adjust the size of the aperture.

12 Claims, 6 Drawing Sheets

SHREDDER ARRANGEMENT

THE PRESENT INVENTION relates to a shredder arrangement suitable for shredding sheet material, particularly a shredder arrangement including a protective guard suitable for preventing fragments of relatively rigid sheet material from striking a user.

Shredding machines, or "shredders" as they are commonly known, are most commonly used for shredding paper, for example in the office or domestic environment, but can also be used to shred relatively rigid sheet materials such as, in particular, CDs or "credit cards" (which includes other similar sized plastic cards such as bank cards, ID cards, library cards etc.).

A problem associated with the shredding of relatively rigid materials is that the rigidity of the material may be such that there is a risk of fragments of the sheet material striking the user as the sheet material is being shredded.

Thus, as a user feeds the relatively rigid sheet material into the shredder and the cutting mechanism begins to the shred the sheet material, fragments may break away from the main body of the sheet material (due to the material being somewhat brittle). In certain cases, sufficient kinetic energy may be imparted to the fragments (for example during fragmentation or as a result of the fragments subsequently falling within the rotary cutting mechanism) to "throw" the fragments back towards the user, whereby they may strike the user and cause injury, particularly to sensitive areas of the face such as the eyes.

In order to combat the above risk of injury, conventional shredders have been provided with protective guards to act as a barrier preventing fragments of the sheet material from reaching the user. The protective guard typically takes the form of a plastic barrier which is positioned across the feed slot of the shredder. In order to allow the rigid sheet material to nevertheless be fed into the feed slot for shredding, the guard includes an aperture so that the sheet material can be inserted through the guard and into the feed slot of the shredder. In order to reduce the likelihood of fragments being thrown back through the aperture in the guard, the size of the aperture is selected so as to correspond to the cross-sectional dimensions of the sheet material being shredded.

Thus, for example, in the case of a guard for use in shredding CDs, the size of the aperture is selected to correspond to the cross-section of a CD, whereas a guard for use in shredding "credit cards" would be provided with a (smaller) aperture corresponding to the cross-section of a standard "credit card". Where a guard is designed for use with both CDs and credit cards, the guard is provided with two respective separate corresponding apertures positioned alongside one another, with one aperture generally being closed-off whilst the other aperture is in use.

A problem associated with such conventional guards is that, as the corresponding plurality of apertures are positioned alongside one another, at least one of the apertures will be "off-set" from the central region of the shredder feed slot, with the result that the sheet material being fed into the "off-set" aperture is necessarily fed towards the cutting mechanism on one side of the feed slot. This can be disadvantageous because it is generally preferred that items to be shredded be inserted "centrally", particularly if, for example, the guard is used in conjunction with a shredder incorporating an "auto-start" sensor. In such cases, it is common for the auto-start sensor to be centrally positioned along one wall of the feed slot, so that feeding the sheet material into the central region of the shredder feed slot is essential to ensure correct operation of the shredder.

It will also be appreciated that arranging a plurality of apertures alongside one another is a rather space-inefficient design, particularly where those apertures are arranged "end-to-end".

It is an object of the present invention to seek to provide an improved shredding arrangement which preferably overcomes one or more of the above problems.

According to the present invention there is provided a shredder arrangement comprising:

i) a housing defining a feed slot for receiving sheet material inserted by a user;

ii) a cutting mechanism for shredding the sheet material inserted through the feed slot; and iii) a protective guard for positioning across the feed slot to prevent relatively rigid sheet material from striking the user during shredding of such sheet material, the guard defining an aperture allowing said sheet material to be inserted through the guard and into the feed slot; wherein:

the protective guard is moveable between a first configuration and a second configuration to symmetrically adjust the size of the aperture.

Optionally, the protective guard is manually moveable to adjust the size of the aperture.

Preferably, when the guard is in the first configuration, the size of the aperture corresponds to the cross-section of a standard credit card and, when the guard is in the second configuration, the size of the aperture corresponds to the cross-section of a standard Compact Disc.

Conveniently, the protective guard is mounted to the housing for selective movement between a non-operative position, away from the feed slot, and an operative position, across the feed slot.

Preferably, in the non-operative position, the protective guard is at least partially retracted within the housing.

Optionally, when the guard is in the second configuration, the guard extends across substantially the entire area of the feed slot.

Preferably, the guard further extends across substantially the entire area of the feed slot when the guard is in the first configuration.

Conveniently, the guard comprises two guard members which together define the aperture, the guard members being slidable relative to one another for symmetrically adjusting the size of the aperture.

So that the invention may be readily understood, embodiments of the invention will now be described, by way of example, with reference to the accompanying drawings, in which.

Figure 1:
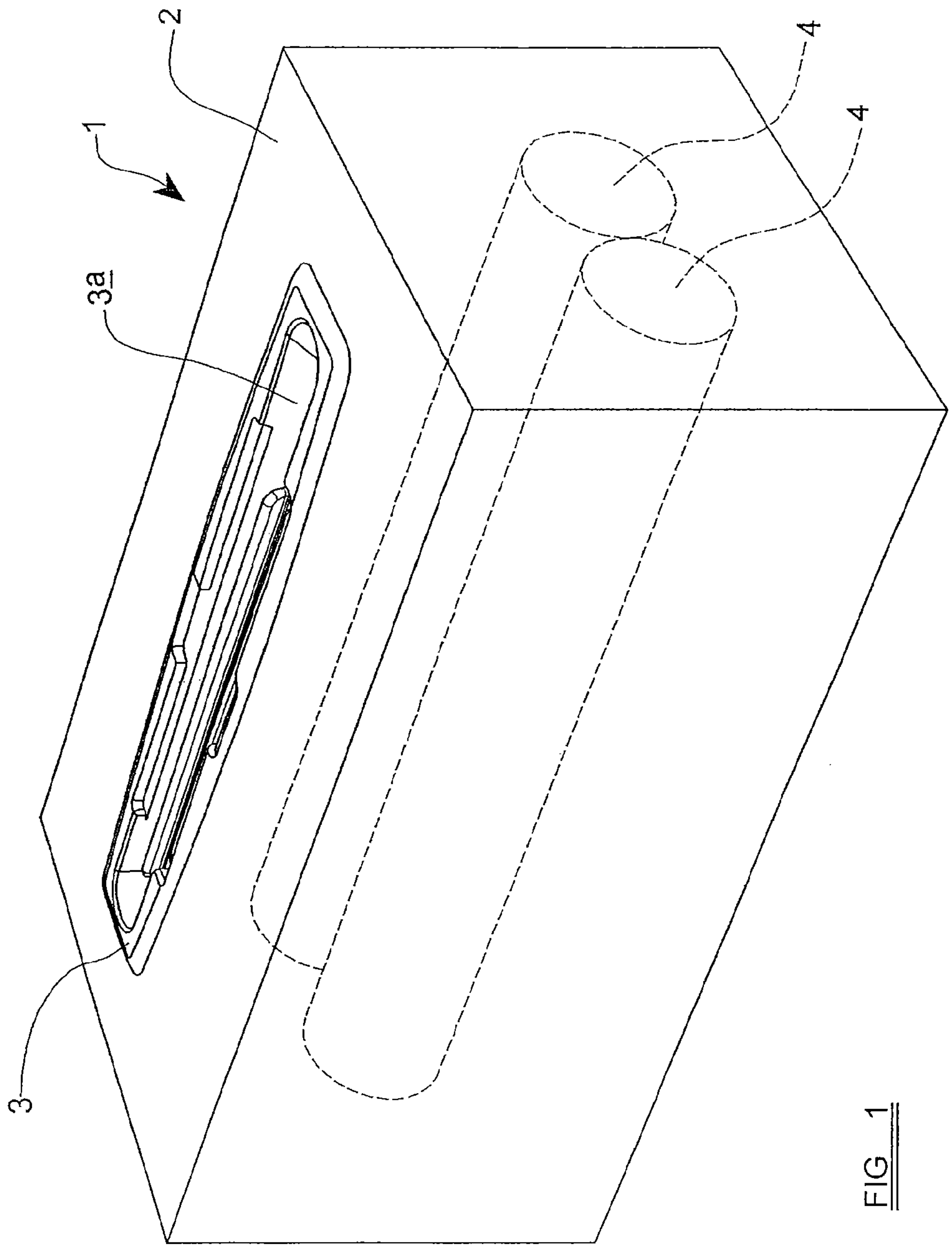
FIG. 1 shows a schematic perspective view of a shredder arrangement according to a first aspect of the present invention.

FIG. 1 shows a shredder arrangement 1 comprising a housing 2 which incorporates a feed slot assembly 3 defining an elongate feed slot 3*a*. The feed slot 3*a* is suitable for receiving sheet material inserted by a user, including paper, CDs and credit cards. A motor-driven rotary cutting mechanism 4 (shown only schematically in FIG. 1) is located within the housing 2, directly below the feed slot 3*a*, whereby sheet material fed through the feed slot 3 engages, and is shredded by, the cutting mechanism 4. The configuration and operation of the cutting mechanism may be entirely conventional, and various forms of cutting mechanism will readily be appreciated by the skilled person.

The entire housing 2 may be mounted, in conventional manner, on some sort of bin, which collects the shredded material beneath the cutting mechanism 4; alternatively, the housing may itself define a bin region, below the cutting mechanism, again in conventional manner.

It will be appreciated to those skilled in the art that the shredder arrangement 1 may optionally include a whole manner of other features such as, for example, an auto-start sensor (not shown) to energise the cutting mechanism automatically once sheet material is inserted through the feed slot 3*a*. However, in the interests of conciseness, no detailed description of features which do not specifically relate to the invention is included here.

Figure 2:
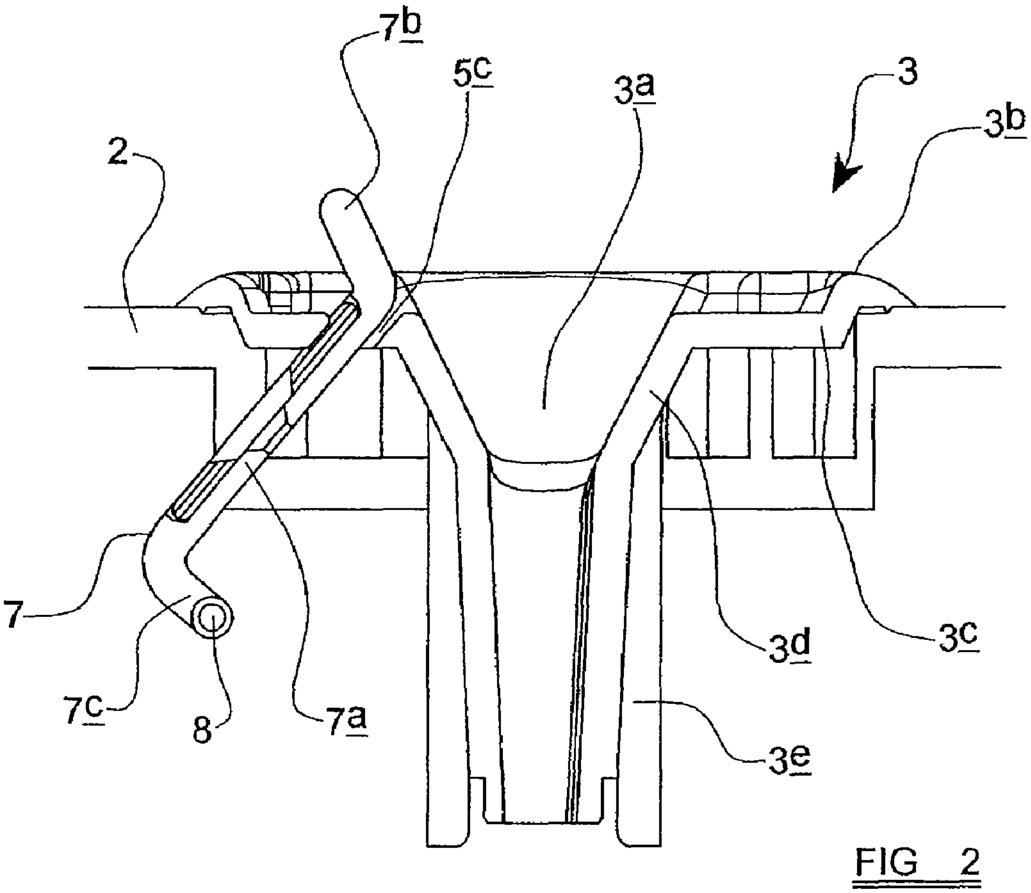
FIG. 2 shows schematic cross sectional view of part of the shredder arrangement of FIG. 1 in more detail, with the protective guard in a retracted, non-operative position.
Figure 3:
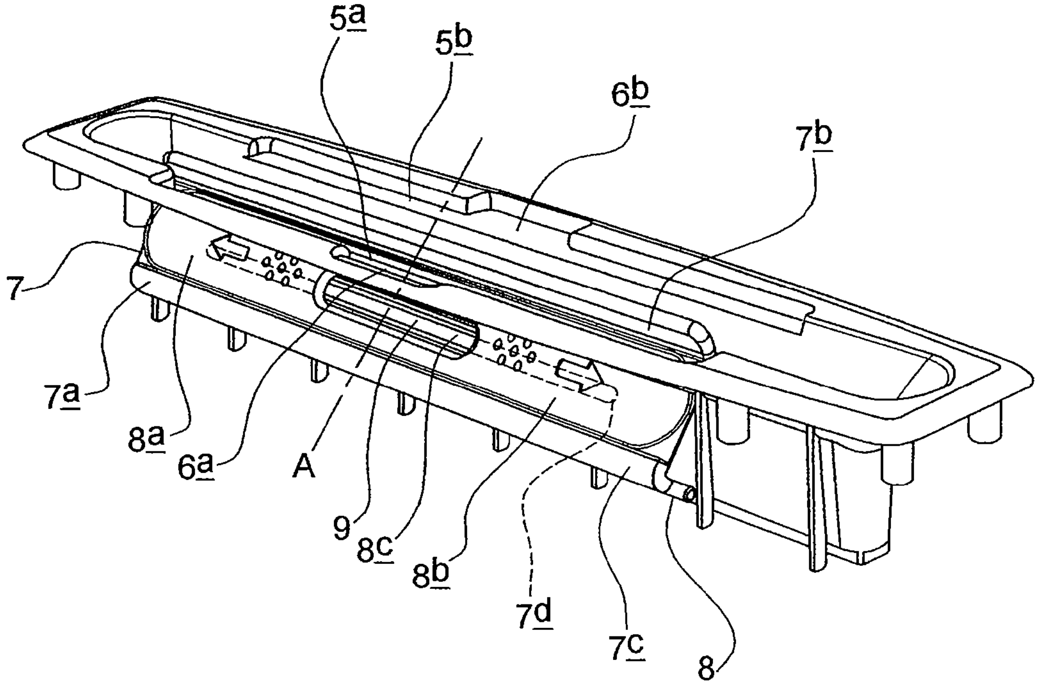
FIG. 3 shows a schematic perspective view corresponding to FIG. 2.

FIGS. 2 and 3 show the feed slot assembly 3 in more detail, with the remainder of the shredder arrangement 1 omitted for clarity.

The feed slot assembly 3 comprises an elongate body portion 3*b* which defines the elongate feed slot 3*a*.

The shape of the elongate body portion 3*b* may be conveniently thought of in terms of a conventional circular funnel which has been stretched along one axis to form an elongate, oval funnel.

Thus, referring to FIG. 2 in particular, which shows the body portion 3*b* in cross-section, the body portion 3*b* comprises a laterally extending peripheral flange portion 3*c*, an upper elongate, circumferential wall section 3*d* which tapers downwardly from the inner edge of the flange portion 3*c* at a relatively shallow angle to the horizontal, and a lower elongate, circumferential wall section 3*e* depending from the lower edge of the upper wall section 3*d* and tapering downwardly at a relatively steep angle to the horizontal. The upper and lower circumferential wall sections thus effectively define a two-step downwardly tapering circumferential wall for the feed slot 3*a*.

As shown most clearly in FIG. 3, the inner edge of the peripheral flange portion 3*c* is recessed to form a pair of corresponding elongate shoulder portions 5*a*, 5*b* positioned centrally along opposite edges of the mouth of the feed slot 3*a*, and is further recessed, at the centre of each shoulder portion 5*a*, 5*b* to form a pair of corresponding, relatively small finger recesses 6*a*, 6*b*, the utility of which will become apparent below. The shoulder portion 5*a* is provided with an elongate slot 5*c*, extending along the full length of the shoulder 5*a*, alongside the mouth of the feed slot 3*a*.

Still referring to FIGS. 2 and 3, the feed slot assembly is further provided with an elongate protective guard 7, which extends through the slot 5*c* in the shoulder 5*a* and which, in FIGS. 2 and 3, is shown in its non-operative, retracted position within the housing, away from the feed slot 3*a*.

As best seen in FIG. 3, the protective guard 7 has a generally "S-shaped" cross section and comprises a generally flat, rectangular base panel portion 7*a* which extends through the slot 5*c*, and two oppositely directed "return" portions 7*b*, 7*c* located either side of the slot 5*c*, the latter "return" portion further including a pair of outwardly extending lugs 8 (of which only one is shown in FIG. 3). The length of the base portion 7*a* is very slightly less than the length of the shoulder portions 5*a*, 5*b*, as well as the length of slot 5*c*.

Still referring principally to FIG. 3, the base panel portion 7*a* further incorporates an elongate guide slot 7*d* extending along the central longitudinal axis of the guard 7 (substantially parallel with the feed slot 3*a*). For reasons which will become apparent below, the guide slot 7*d* is slightly longer than the diameter of a standard CD, so that a standard CD could, in principle, be inserted through the guide slot 7*d* with a little room to spare on either side of the CD.

As best shown in FIG. 3, a pair of identical generally "C-shaped" guard members 8*a*, 8*b* is mounted on the upper surface of the base panel portion 7*a* for sliding movement relative to the base panel portion 7*a*, along the guide slot 7*d*.

Thus, each of the "C-shaped" guard members 8*a*, 8*b* is provided with a securing tab (not shown) which extends down into the guide slot 7*d* and slidably engages the guide slot 7*d* to allow the guard members 8*a*, 8*b* to slide along the guide slot 7*d*, relative to one another, over the upper surface of the base panel portion 7*a*.

It will be appreciated that the outer edges of the guide slot 7*d* effectively act as "stops" for the (sliding) tabs, preventing further outward sliding movement of the guard members 8*a*, 8*b* with respect to the base panel portion 7*a*. In a similar manner, additional stop elements (not shown) are provided on the underside of the base panel portion which prevent the guard members 8*a*, 8*b* from sliding beyond the centre-line A (see FIG. 3) of the base panel portion 7*a*.

There are therefore two configurations for the pair of guard members 8*a*, 8*b* which are symmetric about the centre-line A (see FIG. 3), and the pair of guide members 8*a*, 8*b* is slidably adjustable between these two symmetric configurations.

In the first such symmetric configuration, both of the guard members 8*a*, 8*b* are adjacent the centre-line A of the base panel portion 7*a*. In this configuration, the guard members 8*a*, 8*b* together form a relatively narrow entry slot 8*c* which is aligned directly above the guide slot 7*d* to form a first aperture 9 through the guard 7.

To move from the first symmetric configuration to the second symmetric configuration, each of the guard members 8*a*, 8*b* is simply manually slid along the guide slot 7*d* until the respective tabs engage with the respective outer ends of the elongate guide slot 7*d*, so that each guard member 8*a*, 8*b*. In this second symmetric configuration, the guard members 8*a*, 8*b* combine with the elongate guide slot to form a second, alternative aperture 10 (see FIG. 6) through the guard 7.

The dimensions of the guard members 8*a*, 8*b* and length of the elongate guide slot 7*d* are selected such that the size of the aperture 9 is slightly larger than the cross-section of a standard "credit-card" sized card, whilst the size of the second alternative aperture 10 is slightly larger than the cross-section of a standard CD.

It is to be noted that the guard 7 is not positively secured to the body portion 3*b* of the feed slot assembly in any way, but rather is effectively "floating" in relation to the feed slot assembly 3 (and housing 2). Thus, in the "retracted", non-operative position shown in FIG. 2, the guard 7 effectively "hangs" freely from the body portion 3*b* (specifically the peripheral flange portion 3*c*), with the return portion 7*b* preventing the guard 7 from 'falling' down through the slot 5*c*. The return portion 7*b* is specifically configured so that, when the guard 7 is 'hanging' in its retracted position, the return portion 7*b* effectively forms a continuation of upper circumferential wall portion 3*d* (see FIG. 2).

On the other hand, it will be appreciated that, by manually grasping the return portion 7*b* (in the region of the finger recess 6*a*), a user may nevertheless manually pull the guard 7 up through the slot 5*c* in the direction A (see FIG. 2), whereby the radius of the return portion 7*c* will eventually engage the peripheral flange portion 3$c$, causing the guard 7 to pivot in the direction B (see FIG. 2). In this manner, when shredding relatively rigid sheet material, a user can conveniently move the guard 7 from the retracted, non-operative position shown in FIG. 2 to the operative position shown in FIGS. 4 and 5, where the guard 7 extends centrally across the feed slot 3$a$, and engages the shoulder portions 5$a$, 5$b$. Once in this operative position, the guard provides a level of protection against fragments of relatively rigid sheet material being thrown back through the feed slot, towards the user.

Figure 4:
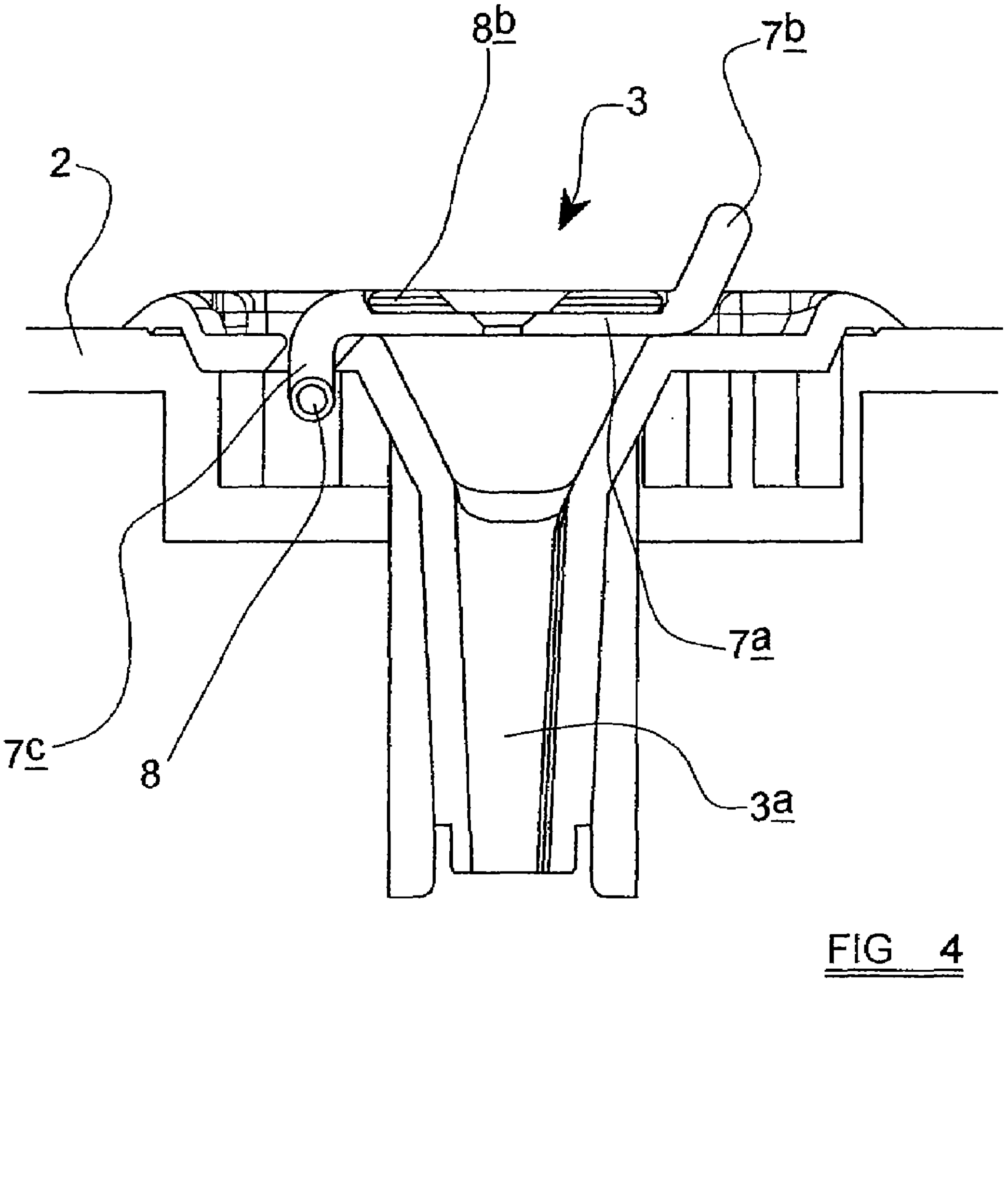
FIG. 4 shows a schematic cross-sectional view corresponding to FIG. 2, but with the protective guard in an operative position.
Figure 5:
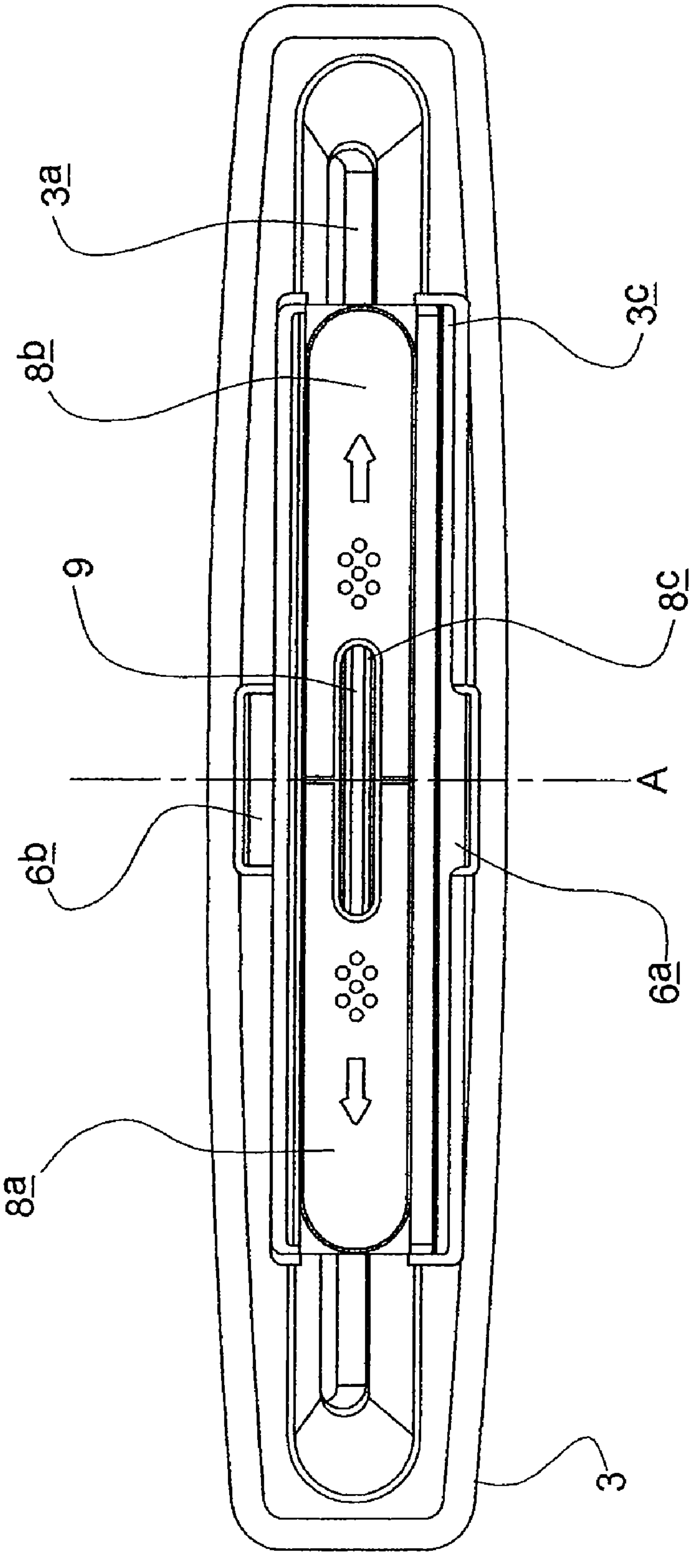
FIG. 5 shows a schematic plan view corresponding to FIG. 4, illustrating the protective guard in a first configuration.

It will be appreciated, referring to FIGS. 4 and 5, that the guard 7 is effectively retained in the operative position until such time as the user manually moves the guard 7 back to the 'hanging' retracted position. Thus, the shoulder portions 5$a$, 5$b$ provide adequate support for the guard 7 on either side of the feed slot, but also effectively prevent any lateral sideways movement of the guard 7 (i.e. along the feed slot 3$a$). At the same time, the lugs 8 effectively prevent the guard 7 from being pulled or pushed upwardly through the slot 5$c$.

Once the guard 7 has been manually moved to the position shown in FIG. 4, the guard 7 can then be manually adjusted between two configurations, depending upon the particular relatively rigid sheet material to be shredded.

Thus, referring to FIG. 5, the first configuration for the guard 7 corresponds to the first symmetric configuration for the pair of guard members 8$a$, 8$b$, whereby the first aperture 9 is formed through the guard 7. With the guard 7 in this configuration, credit-card sized articles may be inserted through the aperture 9 in the guard 7 and fed into the feed slot 3$a$ for shredding by the cutting mechanism 4, whilst the guard 7 protects the user against flying fragments of rigid sheet material being thrown upwardly through the feed slot 3$a$.

Figure 6:
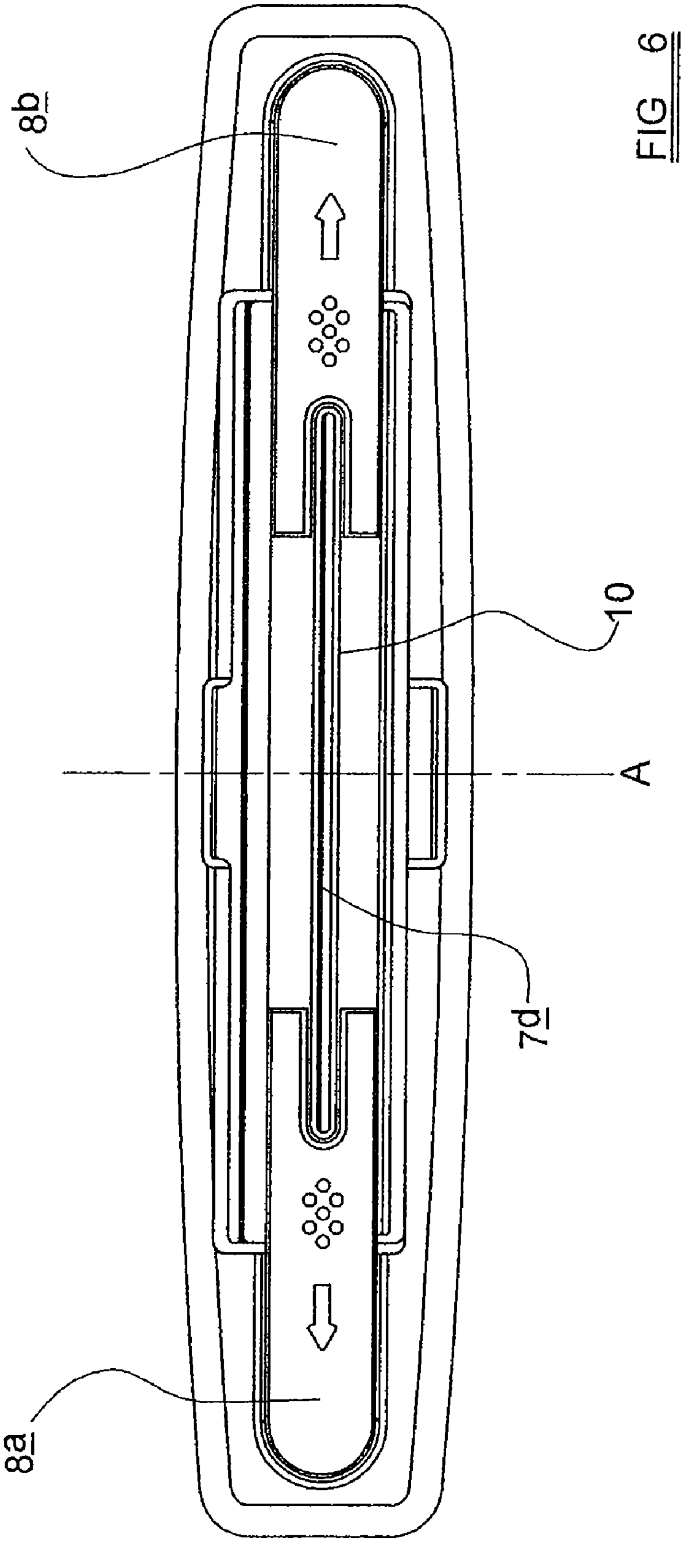
FIG. 6 shows a schematic plan view corresponding to FIG. 4, but illustrating the guard in a second configuration.

In the case where a user desires to shred CDs or CD-sized articles, the guard 7 can be manually adjusted to its second configuration shown in FIG. 6, corresponding to the second symmetric configuration for the pair of guard members 8$a$, 8$b$, whereby the larger, alternative aperture 10 is formed through the guard 7. With the guard 7 adjusted to this second configuration, CDs or the like can be inserted through the larger aperture 10 in the guard 7 and fed into the feed slot 3$a$ for shredding by the cutting mechanism 4. Again, the guard 7 will protect the user against fragments of rigid sheet material being thrown upwardly through the feed slot 3$a$. Here, it is to be noted that, in the second configuration, the guard members 8$a$, 8$b$ actually extend to the outer edges the feed slot 3$a$, so that the guard 7$a$ extends substantially entirely across the entire area of the feed slot 3$a$.

It should be noted that, as the two configurations for the pair of guard members 8$a$, 8$b$ are each symmetric about the centre-line A, movement from one configuration to another configuration represents a symmetric adjustment of the size of the aperture in the guard 7, from aperture 9 to aperture 10 and vice versa. In this manner, the guard 7 provides for adjustment between two aperture sizes, whilst still ensuring that each aperture is 'centralised' above the feed slot 3$a$ and cutting mechanism 4.

Nevertheless, it will be appreciated that, where it is desired to shred relatively flexible material such as, for example, paper or the like, the guard 7 can be retract and stowed away in the position shown in FIG. 3, away from the slot. With the guard in this position, paper can be shredded inserted into the feed slot 3$a$ in the normal manner, whilst the return portion 7$b$ (forming a continuation of the wall portion 3$c$) eases the feeding of sheet material into the feed slot 3$a$.

Whilst the guard 7 is a "floating" guard, which may be retracted into the housing when not in use, it is envisaged that the guard could actually be entirely removable from the shredder, so that the user could simply place the guard across the feed slot as and when required. When not in use, the guard could simply be stowed away in a drawer, preferably in the shredder housing itself.

It will be appreciated that, whilst the present embodiment is directed towards use with CDs and credit cards, and apertures 9 and 10 are dimensioned accordingly, apertures 9 and 10 could be provided in all manner of different sizes, depending upon the intended use of the guard.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A shredder arrangement comprising:

i) a housing defining a feed slot for receiving sheet material inserted by a user;

ii) a cutting mechanism for shredding the sheet material inserted through the feed slot; and iii) a protective guard for positioning across the feed slot to prevent relatively rigid sheet material from striking the user during shredding of such sheet material, the guard defining an aperture allowing said sheet material to be inserted through the guard and into the feed slot; wherein:

the protective guard is moveable between a first configuration and a second configuration to symmetrically adjust the size of the aperture.

2. A shredder arrangement according to claim 1, wherein the protective guard is manually moveable to adjust the size of the aperture.

3. A shredder arrangement according to claim 1 wherein, when the guard is in the first configuration, the size of the aperture corresponds to the cross-section of a standard credit card and, when the guard is in the second configuration, the size of the aperture corresponds to the cross-section of a standard Compact Disc.

4. A shredder arrangement according to claim 1, wherein the protective guard is mounted to the housing for selective movement between a non-operative position, away from the feed slot, and an operative position, across the feed slot.

5. A shredder arrangement according to claim 4, wherein in the non-operative position, the protective guard is at least partially retracted within the housing.

6. A shredder arrangement according to claim 3, wherein when the guard is in the second configuration, the guard extends across substantially the entire area of the feed slot.

7. A shredder arrangement according to claim 6, wherein the guard further extends across substantially the entire area of the feed slot when the guard is in the first configuration.

8. A shredder arrangement according to claim 1, wherein the guard comprises two guard members which together define the aperture, the guard members being slidable relative to one another for symmetrically adjusting the size of the aperture.

9. A shredder arrangement according to claim 8, wherein the two guard members are slidable toward and away from one another in a direction parallel to a direction of elongation of the feed slot.

10. A shredder arrangement according to claim 1, wherein the guard comprises two guard members, each guard member being moveable with respect to the feed slot.

11. A shredder arrangement according to claim 10, wherein the two guard members together define the aperture and are moveable toward and away from one another in a direction parallel to a direction of elongation of the feed slot.

12. A shredder arrangement according to claim 1, wherein the aperture defined when the protective guard is in the first configuration is smaller than the aperture defined when the protective guard is in the second configuration.

* * * * *

UNITED STATES PATENT AND TRADEMARK OFFICE

CERTIFICATE OF CORRECTION

PATENT NO. : 7,618,001 B2
APPLICATION NO. : 11/943234
DATED : November 17, 2009
INVENTOR(S) : Paul Arthur Aries et al.

It is certified that error appears in the above-identified patent and that said Letters Patent is hereby corrected as shown below:

Title page item 75 Inventors: Paul Arthur Aries:

change “Bierley Hills” to --Brierley Hill--.

Signed and Sealed this

Fifth Day of January, 2010

David J. Kappos
*Director of the United States Patent and Trademark Office*